United States Patent [19]
Murray et al.

[11] 3,891,775
[45] June 24, 1975

[54] VENTABLE TOASTER PACKAGE

[76] Inventors: Edward J. Murray, 6104 California St., Apt. 1, San Francisco, Calif. 94121; Andrew C. Piggot, 289 Miramontes Rd., Woodside, Calif. 94062

[22] Filed: Oct. 23, 1973

[21] Appl. No.: 408,622

[52] U.S. Cl. .............. 426/107; 229/51 S; 229/62.5; 229/DIG. 14; 426/113; 426/126
[51] Int. Cl. ............................................. B65b 25/22
[58] Field of Search .......... 426/113, 114, 412, 410, 426/123, 126, 127, 129, 118, 395, 107; 229/DIG. 14, 62.5, 51 S

[56] References Cited
UNITED STATES PATENTS

| | | | |
|---|---|---|---|
| 2,807,550 | 9/1957 | Zarotschenleff et al. | 426/113 |
| 3,322,319 | 5/1967 | Sweeney et al. | 426/113 X |
| 3,392,033 | 7/1968 | Thulin | 426/113 X |
| 3,410,700 | 11/1968 | Gstohl | 426/107 |
| 3,469,998 | 9/1969 | Lane | 426/106 X |
| 3,556,816 | 7/1971 | Nughes | 426/126 |
| 3,597,238 | 8/1971 | Scharre | 426/113 X |
| 3,615,706 | 10/1971 | Robinson | 426/113 X |
| 3,615,711 | 10/1971 | Markus et al. | 426/110 |
| 3,689,291 | 9/1972 | Draper | 426/123 X |
| 3,741,778 | 6/1973 | Rowe | 426/113 X |

Primary Examiner—Frank W. Lutter
Assistant Examiner—Steven L. Weinstein
Attorney, Agent, or Firm—Herbert C. Schulze

[57] ABSTRACT

This invention is a method, and apparatus, for the processing, preservation, and preparation for consumption of foods in which a quantity of food is preserved in a pouch-like container of appropriate size and shape to be heated for serving in a toaster or the like, and particularly characterized by a heat transfer coating on the exterior of the pouch.

4 Claims, 7 Drawing Figures

PATENTED JUN 24 1975 3,891,775
SHEET 2
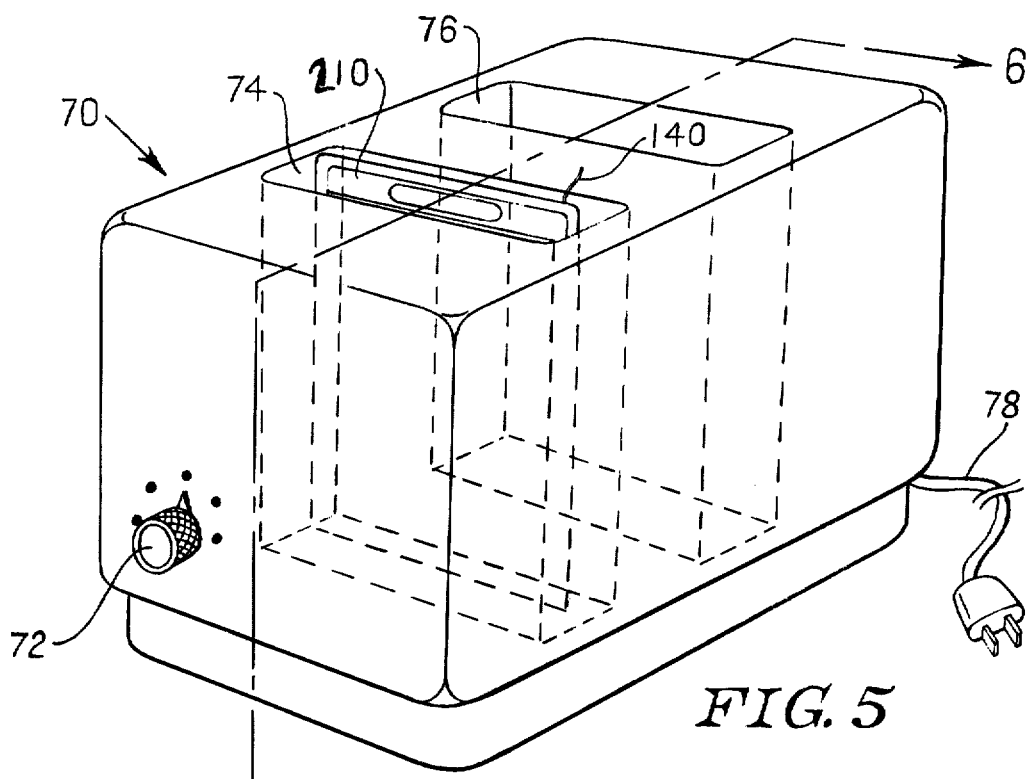
FIG. 5
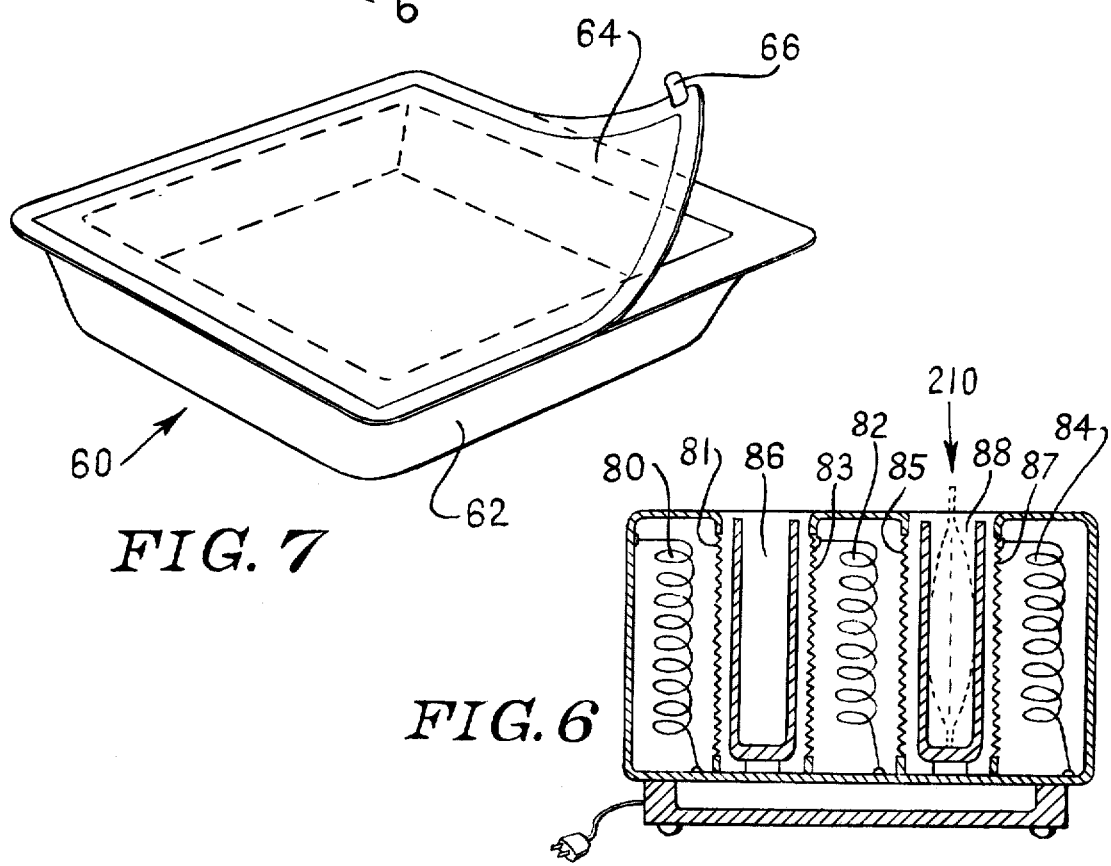
FIG. 7
FIG. 6

VENTABLE TOASTER PACKAGE

BACKGROUND OF THE INVENTION

1. Field of the Invention

This invention is in the general field of preserved foods, and more particularly in the field of preserved foods which should be heated for final preparation prior to consumption.

2. Description of the Prior Art

There are many ways of preserving foods and preparing the same for consumption. For example, there are frozen foods which are well understood in the art and require thawing and heating in an oven or otherwise; there are canned foods which are preserved in a metallic or glass container and heated in a pan, oven, or the like prior to serving; there are even some foods prepared and preserved within flexible pouches of plastic lined metal foil and the like which require heating in pans or the like prior to consumption.

We know of no packaging of foods in a container in the nature of a flexible pouch, having a heat transfer surface on the exterior, suitable to be heated for serving in a toaster. In this sense, there is no specific art as to the present invention.

SUMMARY OF THE INVENTION

We have made a study of the packages food situation throughout the industry and have discovered a number of apparently unrelated facts and requirements for which no one has found a suitable answer. Such matters include the desirability of individual portion sized packages of food for use by individuals living alone or requiring special diets; we have found a dirth of available packages which can be heated for hot dishes without the necessity of major heating devices and utensils requiring cleaning; we have found a requirement for a package incorporating an easy method to detect the presence of botulism when the same occurs; we find a great requirement for a food package which may be disposed of readily and with greater ease than a customary can or jar.

Other requirements for a convenient hot food package which can be heated almost anyplace without the problem of special utensils and the like will be known to those who have studied this field of activity.

We have discovered that there is now available a new type food package utilizing a soft pouch to contain the food such as that produced by the Hydropac Sterilizer system of Food Machinery Corporation, in which a pouch comprising an aluminum foil with a coating of mylar and an inner coating of polyethylene is a very acceptable food package and preserves foods extremely well. In fact, such package preserves foods as well as in cans, but with the advantage of ease of shipment and particularly greater ease of disposition of the used pouch. Such pouch package, however, still requires extensive preparation by placing the contents into boiling water or the like, or into an oven or the like, for proper heating.

We have also studied various kitchen appliances and have discovered that the common toaster is one of the most efficient heating units available for the preparation of any type of food. Up to now, however, it has not been practical to use the toaster for more than a very limited number of foods such as, bread, being toasted; pre-cooked waffles being reheated, and the like.

It occurred to us that the pouch of food, if made in the correct configuration, might be heated within a toaster rapidly and efficiently. Thus, we prepared sample pouches and attempted to heat them and found that they would not properly heat. After considerable study addressed to this problem, we have discovered that with the proper heat absorption coating placed over the outer aluminum foil we were able to effect very rapid transfer of heat and a thorough heating of these food packages.

We have now made many experiments and have obtained excellent and unusual results utilizing pouches of food heated in this manner.

We did discover, of course, when the pouch became heated within the toaster we occasionally had difficulties due to the generation of steam within the pouch, and we have provided a means to alleviate this problem. The food packaged and so heated is always known to be safe, since a package in which botulism exists will be obviously swollen and bloated when in the form of a pouch of this nature.

It is an object of this invention to provide a method and apparatus by which individual quantities of preserved food may be rapidly heated for serving and consumption;

It is a further object of this invention to provide the method and apparatus above mentioned in which an ordinary household toaster may be used to heat the final package of preserved food;

Another object of this invention is to provide a method and apparatus as mentioned in which provision is made to allow for the escaping of steam generated during the heating of the food.

The foregoing and other objects and advantages of this invention will become clear to those skilled in the art upon reading of the Description of a Preferred Embodiment which follows, together with a study of the appended drawings.

BRIEF DESCRIPTION OF THE DRAWINGS

FIG. 5 is a perspective of a preferred embodiment of a toaster to practice the method of this invention;

FIG. 6 is a reduced section on 6—6 of FIG. 5; and

FIG. 7 is a perspective view of an alternate package to practice the method of this invention.

DESCRIPTION OF A PREFERRED EMBODIMENT

In the practice of this invention, food is prepared for packaging in a manner well known in the art, such as cooking, and is packaged by the method known in the art, such as the method of the Hydropac Sterilizing method of Food Machinery Corporation.

In this packaging, foods are appropriately preserved, such as by appropriate heating, vacuum sealing, and the like, as is known in the art, and by sealing within a pouch as is known, and as described below.

In order, particularly to practice this invention, the size of each individual package must be such size as will fit into a standard toaster. The size of the packet while normally not considered an inventive discovery, in this case is critical. Until our discovery, flexible packets of food have been of a size not suitable to place into a toaster. Additionally, and preferably, the packet will have a handle. This handle will allow for easy lowering into a toaster and removal therefrom. Also, most desirably, the packet will incorporate means for providing an opening to allow the escape of steam during the heating process.

Figure 1:
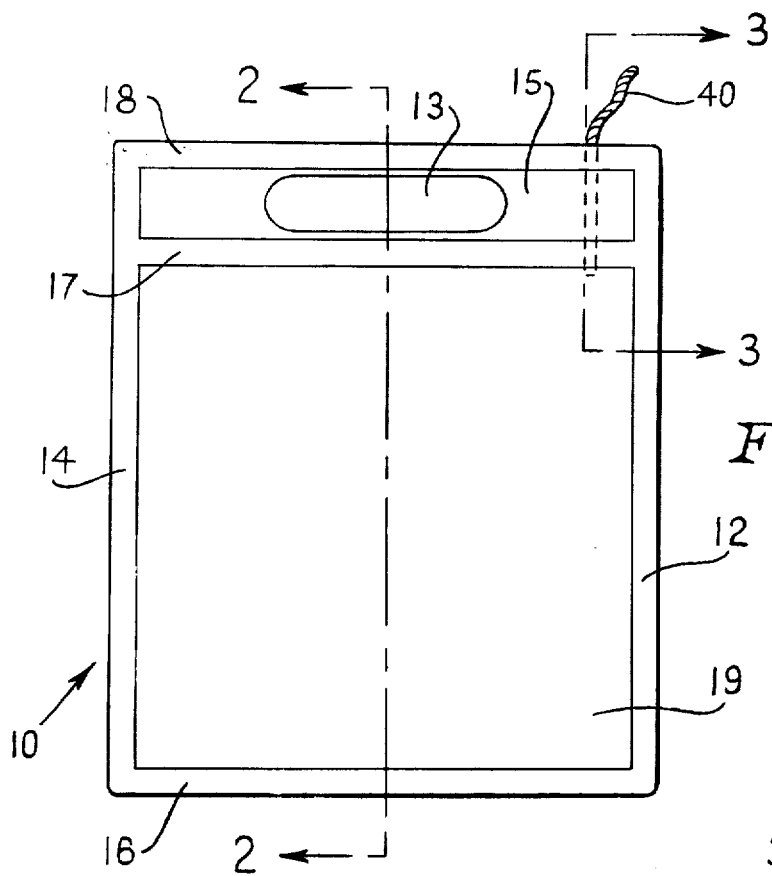
FIG. 1 is a plan view of a preferred embodiment of a food package to practice the method of this invention.
Figure 2:
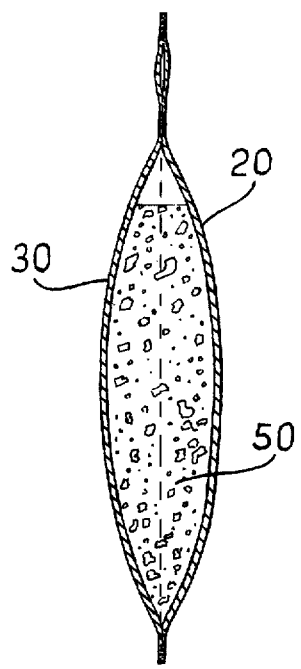
FIG. 2 is a section of 2—2 of FIG. 1.
Figure 3:
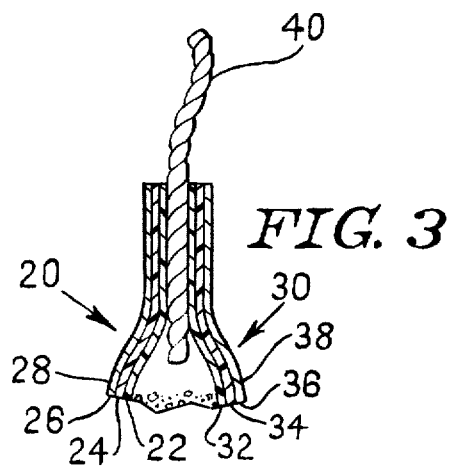
FIG. 3 is an enlarged section on 3—3 of FIG. 1.

A most desirable packet for the food and to practice this invention is illustrated in FIGS. 1, 2, and 3.

FIGS. 1, 2 and 3 show a packet 10 comprising essentially two sheets 20 and 30, which are heat sealed completely around the edges 12, 14, 16 and 18 and also heat sealed at a point intermediate the top edge 18 and the lower edge 16 in order to provide for a cut out 13 to form a handle within portion 15 heat sealed on all sides and isolated from the food pouch itself contained within the lower margin of the various heat sealed areas.

The handle is easily formed as noted by means of the cut out portion through which the fingers may be inserted for holding the packet and inserting into, and removing from, the toaster. Under some circumstances it may be desired to leave the upper edge 18 unsealed in order to provide the possibility of utilizing this handle portion in a dual capacity. What is left unsealed, it may easily be used to tear open the pouch at its upper edge 17 by merely pulling apart the two sheets on each side of the handle. This may also be accomplished, as indicated in FIG. 2, wherein that upper portion of the handle area within the sealed portions still allows a small tab for tearing apart.

Preferably a cord 40 of sterile material, which will not affect food, such as polyethylene or the like, will be sealed in position as indicated. When this cord is pulled out, it provides a small opening for the escape of steam as is generated during the heating process which will be described later. If desired, an in lieu of the cord 40, the pouch can be punctured with a sharp object, such as a knife, near its upper edge, prior to the heating rather than the use of the cord. The puncturing will, also, allow the escape of steam, and may be deemed a simpler method, but requires the additional use of such a utensil, and makes potential tearing and spillage of the materials somewhat more probable. Thus, while usable, it is not most preferable.

It has been previously mentioned that the basic pouch for the containing of foods is known and practiced as indicated in the Food Machinery Hydropac Sterilizing system. Such basic pouch, however, is not suitable for practicing the method of this invention. This is due to several factors of which the most important is the inability of the heretofore known pouch to effect heat transfer rapidly and properly in connection with the toaster, and to the unavailability of proper size pouch for the use in a toaster.

Figure 4:
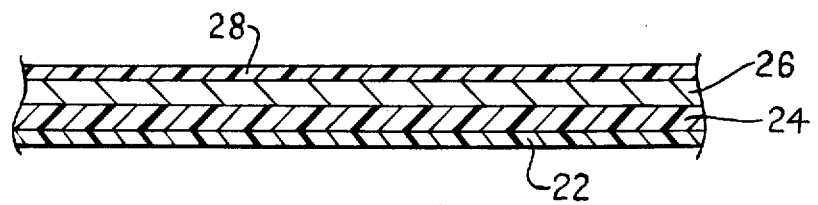
FIG. 4 is an enlarged sectional view of a preferred material to be used in the embodiments shown in FIG. 1.

FIG. 4 illustrates in greatly enlarged section one desirable combination of materials for the accomplishment of a proper pouch for the practicing of this invention. The inside 22 (32 for sheet 30) or the material which will be in contact with the food, may be preferably of polyethelene or the like. For bonding, the polyethelene is upon a layer of mylar 24 (34 for sheet 30). The layer of mylar in turn is upon a sheet of aluminum foil 26 (36 for sheet 30). These three materials constitute the heretofore known material for a food packet for the type previously described and known. We have made the further addition that the aluminum is now coated on its other side. On the other side the aluminum carries a heat transfer coating 28 (38 for sheet 30). This coating may be a high heat resistant insulating material with a high degree of heat transferability, such as high temperature black paint. Additionally, the coating could be a special heat transfer anodizing which has certain obvious advantages in that it will be less likely to be damaged or scratched in handling. Even when the high heat resistant paint is used, however, in normal handling scratching and the like of this outer coating will be so minute as to cause no appreciable reduction of the heat transfer effectiveness.

For greatest effectiveness, the toaster used to heat these individual packages will be a toaster incorporating a pop-up type feature, as is well known in the art, but in which the means to impart the pop-up feature will be unusually strong so as to pop up a packet weighing 10 ounces. 10 ounces has been suggested, since this will be the approximate weight of the average individual portion.

The ordinary toaster heretofore known and used in the home and immediately available to most people, may still be used, rather than the special type pop-up toaster mentioned. While this type toaster will not ordinarily lift the packet of food, nonetheless, it will hold the food down until the appropriate time has been passed, and which the food is thoroughly heated, at which time the packet may be manually removed.

When using the special toaster, it should be noticed that the special toaster should also incorporate special timing means, which timing means should be positively related to a fixed time such as in minutes and/or seconds so as to allow for the adequate heating by a proper timed method. Numerous foods may be so packaged, and the following is a list of some of the foods, together with the recommended time for heating in this method where various packages are utilized as such size that they will fit into a customary toaster.

| PRODUCT | WEIGHT | TIME | FINAL TEMP. |
|---|---|---|---|
| Mixed vegetables | 9 oz. | 5 min. | 151 F |
| Butter Beans | 5 oz. | 3 min. | 172 F |
| Cream Corn | 6 oz. | 3 min. | 143 F |
| Water | 6 oz. | 4 min. | 205 F |
| German Potato Salad | 9 oz. | 5 min. | 140 F |
| Pork sausage links (8 links) | 5½ oz. | 3 min. | 150 F |
| Pork sausage links (8 links) | 5½ oz. | 4 min. | 174 F |
| Beef Stew | 8 oz. | 3 min. | 180 F |
| Fancy Cut Green Beans | 7¾ oz. | 4 min. | 196 F |
| Chili Con Carne | 7 oz. | 4 min. | 168 F |
| Peas | 6 oz. | 3 min. | 155 F |

As illustrated in FIGS. 5 and 6, the toaster 70 will have two pockets or openings, 74 and 76 will pop-up carriers 88 and 86 within each of the said openings. The carriers will normally be of insulated material, such as ceramic coated metal, or the like as known in the art, to avoid the possibility of an electrical short between the packet and the elements of the electrical toaster. Heating elements 80, 82 and 84 are provided which are illustrated merely schematically in FIG. 6, together with protective grids 81, 83, 85 and 87. Details of construction will be familiar to those skilled in the toaster art, and of course, it will be understood, that a power cord or the like 78 will be provided as well as a timer 72. A food packet 210 having a pull cord 140 is shown in phantom in place within this unit for purposes of illustration.

Details of construction of the special toaster has not been otherwise shown, since the toaster is well developed, and those skilled in this art will understand the timing means, the pop-up means, the insulated carrier means, and all of the other features of a toaster.

An alternate embodiment of a package to practice the method of this invention is shown in FIG. 7, wherein the package generally 60 comprises a sheet of material essentially similar in construction to that heretofore described, but in which basic portion 62 is formed as a dish, and in which the aluminum of which it is formed is of a heavier gauge so as to hold this shape substantially as shown throughout the whole process and use.

The covering 64 is illustrated partially pulled open by the pull tab 66, which will break the seal around the edge at the top to allow the escape of steam at this corner during the heating process. Thereafter the cover 64 will be completely sealead off and the food may be eaten directly from the dish-like element 62.

It will also be recognized by those skilled in the art that a packet could be made which would be essentially the shape of a piece of bread or the like, in which the sheets of material from which the packet was made would be so shaped as to impart an essentially cubic dimension rather than allowing the packet to merely bulge out from the nature of its softness and filling.

In a complete method of this invention, the steps involved will include the preserving, whether by heat, vacuum packing, or a combination, freezing, or other method, wherein the foods so preserved are in a flexible packet, the further sterilizing of the said packet and its contents, the sealing of said packet by the means known in the art, and particularly by the use of the Food Machinery Corporation Hydropac Sterilizing method, the storing of the packet at any appropriate place, the transporting of the packet to the ultimate consumer which may include the passage through many hands including distributors, retailers and the like, the further holding and storage of the packet by the ultimate consumer, the step of making an opening in one portion of the packet for the escape of steam in the heating process which follows, the placing of the said packet in a toaster in which said heating takes place, the ultimate removing of the said packet from the toaster when the heating has been completed, and the opening of the packet to expose the foods therein for consumption, and the draining of excess fluids, prior to consumption.

While the embodiments of this invention specifically shown and described are fully capable of achieving the objects and advantages desired, such embodiments have been illustrated and described solely for purposes of illustration and description in connection with an understanding of this invention and not for the purposes of limitation.

We claim:

1. A food packet, for use as both a food storage and heating container, comprising:
   a. two opposed substantially rectangular panels of laminated heat sealable sheets which are heat sealed together at their edges to form a container having a cavity in which the foodstuffs prepared for consumption are contained,
   b. the laminated sheets having an aluminum outer sheet, a mylar intermediate layer, and a polyethylene inner layer, and the aluminum outside surface having a heat absorbing coating to provide a nontearable sheet which readily passes heat therethrough,
   c. the sheets being dimensioned so that the entire food packet can be placed within the receiving slot of a heater unit,
   d. the upper periphery of the container having an integral handle section formed therewith,
   e. a pull type venting element of small cross section having its central portion sealed between the opposed laminated sheets along the upper heat sealed section immediately above the food containing cavity, with its lower end extending into the food containing cavity and having an upper section extending out of the food packet and of sufficient length to be grasped by the user to that the entire element can be pulled free of the packet to provide a venting passageway at the top of the packet.

2. The food packet of claim 1, wherein:
   a. the two laminated sheets have opposed free sections which can be grasped by te user to assist in tearing the package open along one of the heat sealed sections.

3. The food packet as set forth in claim 1, wherein:
   a. the laminated sheets extend upwardly above the upper heat sealed section to provide the handle section,
   b. the venting element extends upwardly through the handle section.

4. The food packet as set forth in claim 3, wherein:
   a. the handle section has a cut-out in the handle section, and
   b. the upper portion of the handle has a section wherein the opposed laminated sheets are not joined and of such dimension to permit the user to grasp each of the opposed sheets and to pull them apart to open the packet.

* * * * *